United States Patent
Ehman et al.

(10) Patent No.: US 6,184,682 B1
(45) Date of Patent: Feb. 6, 2001

(54) CORRECTION OF MR IMAGES FOR MOTION ARTIFACTS USING NAVIGATOR ECHOES AND AUTOCORRECTION

(75) Inventors: Richard L. Ehman; Joel P. Felmlee; Armando Manduca; Kiaran P. McGee, all of Rochester, MN (US)

(73) Assignee: Mayo Foundation for Medical Education and Research, Rochester, MN (US)

( * ) Notice: Under 35 U.S.C. 154(b), the term of this patent shall be extended for 0 days.

(21) Appl. No.: 09/290,817

(22) Filed: Apr. 13, 1999

Related U.S. Application Data

(60) Provisional application No. 60/109,704, filed on Nov. 24, 1998, provisional application No. 60/081,864, filed on Apr. 15, 1998, and provisional application No. 60/109,488, filed on Nov. 23, 1998.

(51) Int. Cl.⁷ .................................................... G01V 3/00
(52) U.S. Cl. ........................ 324/309; 324/307; 324/300
(58) Field of Search .................................... 324/309, 300, 324/307; 128/653

(56) References Cited

U.S. PATENT DOCUMENTS

| | | | |
|---|---|---|---|
| 4,567,893 | 2/1986 | Charles et al. | 128/653 |
| 4,663,591 | 5/1987 | Pelc et al. | 324/309 |
| 4,706,026 | 11/1987 | Pelc et al. | 324/309 |
| 4,731,583 | 3/1988 | Glover et al. | 324/309 |
| 4,937,526 | 6/1990 | Ehman et al. | 324/309 |
| 5,427,101 | * 6/1995 | Sachs et al. | 324/309 |
| 5,539,312 | * 7/1996 | Fu et al. | 324/309 |
| 5,800,354 | * 9/1998 | Hofland et al. | 600/410 |

FOREIGN PATENT DOCUMENTS

WO9801828A1   1/1998   (EP) ................... G06T/11/00

OTHER PUBLICATIONS

*Automatic Compensation of Motion Artifacts In MRI,* MRM 41:163–170 (1999), Atkinson, et al.
*An Autofocus Algorithm for the Automatic Correction of Motion Artifacts in MR Images,* pp. 341–354, David Atkinson, et al.

* cited by examiner

Primary Examiner—Christine K. Oda
Assistant Examiner—Brij B. Shrivastav
(74) Attorney, Agent, or Firm—Quarles & Brady, LLP

(57) ABSTRACT

Navigator echo signals are acquired during an MRI scan in which image data is acquired. The navigator echo signals are used to estimate an initial correction of the acquired image data for patient motion during the scan. The initially corrected image data is then autocorrected in an iterative process which measures image quality and makes further corrections to the image data until the measured image quality is within tolerance.

9 Claims, 3 Drawing Sheets

CORRECTION OF MR IMAGES FOR MOTION ARTIFACTS USING NAVIGATOR ECHOES AND AUTOCORRECTION

This application is based upon U.S Provisional Pat. application Ser. Nos. 60/109,704; 60/081,864 and 60/109,488 filed on Nov. 24, 1998; Apr. 15, 1998 and Nov. 23, 1998, respectively.

BACKGROUND OF THE INVENTION

The field of the invention is nuclear magnetic resonance imaging methods and systems. More particularly, the invention relates to the correction of motion artifacts in MR images.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated, this signal may be received and processed to form an image.

When utilizing these signals to produce images, magnetic field gradients ($G_x$ $G_y$ and $G_z$) are employed. Typically, the region to be imaged is scanned by a sequence of measurement cycles in which these gradients vary according to the particular localization method being used. The resulting set of received NMR signals are digitized and processed to reconstruct the image using one of many well known reconstruction techniques.

Object motion during the acquisition of NMR image data produces both blurring and "ghosts" in the phase-encoded direction. Ghosts are particularly apparent when the motion is periodic, or nearly so. For most physiological motion each view of the NMR signal is acquired in a period short enough that the object may be considered stationary during the acquisition window. In such case the blurring and ghosting is due to the inconsistent appearance of the object from view to view. Motion that changes the appearance between views such as that produced by a patient moving, by the respiration or the cardiac cycle, or by peristalsis, is referred to hereinafter as "view-to-view motion". Motion may also change the amplitude and phase of the NMR signal as it evolves during the pulse sequence and such motion is referred to hereinafter as "in-view motion".

Both blurring and ghosting can be reduced if the data acquisition is synchronized with the functional cycle of the object to reduce view-to-view motion. This method is known as gated NMR scanning, and its objective is to acquire NMR data at the same point during successive functional cycles so that the object "looks" the same in each view. The drawback of gating is that NMR data may be acquired only during a small fraction of the object's functional cycle, and even when the shortest acceptable pulse sequence is employed, the gating technique can significantly lengthen the data acquisition.

Another proposed method for eliminating ghost artifacts is disclosed in U.S. Pat. No. 4,567,893, issued on Feb. 4, 1986. This prior patent teaches that the distance in the image between the ghosts and the object being imaged is maximized when the NMR pulse sequence repetition time is an odd multiple of one-fourth of the duration of the periodic signal variation. This can be used to alleviate ghosts due to respiratory motion. While this method, indeed, improves image quality, it does impose a constraint on the NMR pulse sequence repetition time and it often results in a longer total scan time. It also assumes that the motion is periodic.

Yet another method for reducing the undesirable effects due to periodic signal variations is disclosed in U.S. Pat. No. 4,706,026 issued on Nov. 10, 1987 and entitled "A Method For Reducing Image Artifacts Due To Periodic Variations In NMR Imaging." In one embodiment of this method, an assumption is made about the signal variation period (e.g. due, for example, to patient respiration) and the view order is altered from the usual monotonically increasing phase-encoding gradient to a preselected order. For a given signal variation period, a view order is chosen so as to make the NMR signal variation as a function of the phase-encoding amplitude be at a desired frequency. In one embodiment, the view order is selected such that the variation period appears to be equal to the total NMR scan time (low frequency) so that the ghost artifacts are brought as close to the object being imaged as possible. In another embodiment (high frequency), the view order is chosen to make the variation period appear to be as short as possible so as to push the ghost artifacts as far from the object as possible.

This prior method is effective in reducing artifacts, and is in some respects ideal if the variation is rather regular and at a known frequency. On the other hand, the method is not very robust if the assumption made about the motion temporal period does not hold (e.g., because the patient's breathing pattern changes or is irregular). If this occurs, the method loses some of its effectiveness because the focusing of the ghosts, either as close to the object or as far from the object as possible, becomes blurred. A solution to this problem is disclosed in U.S. Pat. No. 4,663,591 which is entitled "A Method For Reducing Image Artifacts Due To Periodic Signal Variations in NMR Imaging." In this method, the non-monotonic view order is determined as the scan is executed and is responsive to changes in the period so as to produce a desired relationship (low frequency or high frequency) between the signal variations and the gradient parameter. The effectiveness of this method, of course, depends upon the accuracy of the means used to sense the patient motion, and particularly, any variations in the periodicity of that motion.

Yet another method for reducing motion artifacts in NMR images is referred to in the art as "gradient moment nulling". This method requires the addition of gradient pulses to the pulse sequence which cancel, or null, the effect on the NMR signal phase caused by spins moving in the gradients employed for position encoding. Such a solution is disclosed, for example, in U.S. Pat. No. 4,731,583 entitled "Method For Reduction of NMR Image Artifacts Due To Flowing Nuclei By Gradient Moment Nulling".

The most successful method for correcting MR images for motion artifacts employs navigator signals acquired during the scan. As described in U.S. Pat. No. 4,937,526, such navigator signals are acquired periodically during the scan, and the information in these signals may be used to correct the image data for patient motion. Unfortunately, acquisition of the navigator signals increases the scan time.

More recently, an automatic correction method has been proposed by D. Atkinson et al., "Information Processing in Medical Imaging", P.341–354,1997. This method is an adaptive motion correction algorithm that does not require an in vivo measurement of the motion record, but instead, applies motion correction estimates to the k-space data. The entropy of the reconstructed image is examined as a focus criterion by which to iteratively adjust the motion estimate. This prior method, due to the properties of entropy, works mostly by making dark areas as dark as possible (thus removing ghosting), but does not use much information from the bright areas of the image. As a consequence, MR images processed in this manner often do not become as sharp as they should be. While this method works well on simple test images, it requires extended processing time when used to correct clinical images.

SUMMARY OF THE INVENTION

The present invention relates to a significant improvement in the autocorrection approach which makes it a practical tool for the correction of clinical images. More specifically, the present invention is an improved autocorrection method in which a navigator echo signal is acquired and used to measure patient position, image data is acquired by sampling regions of k-space, correcting the regions of k-space data are corrected using the measured position to calculate an initial correction estimate; and performing an autocorrection of the k-space data by iteratively estimating corrections to the k-space data, reconstructing an image using the corrected k-space data, measuring the quality of the reconstructed image and repeating the autocorrection until image quality is within tolerance. By "seeding" the autocorrection of the k-space data based on measured patient position determined from a navigator echo signal, the process rapidly converges to the best image quality possible.

A general object of the invention is to reduce the time required to autocorrect an image. By increasing the scan time by a small amount in order to acquire one or more of navigator echo signals, the processing time required to produce the best image possible is significantly reduced. In a preferred embodiment, the processing time required to perform autocorrection of an image was reduced by 50% when an initial motion correction based on navigator signal position information was made.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
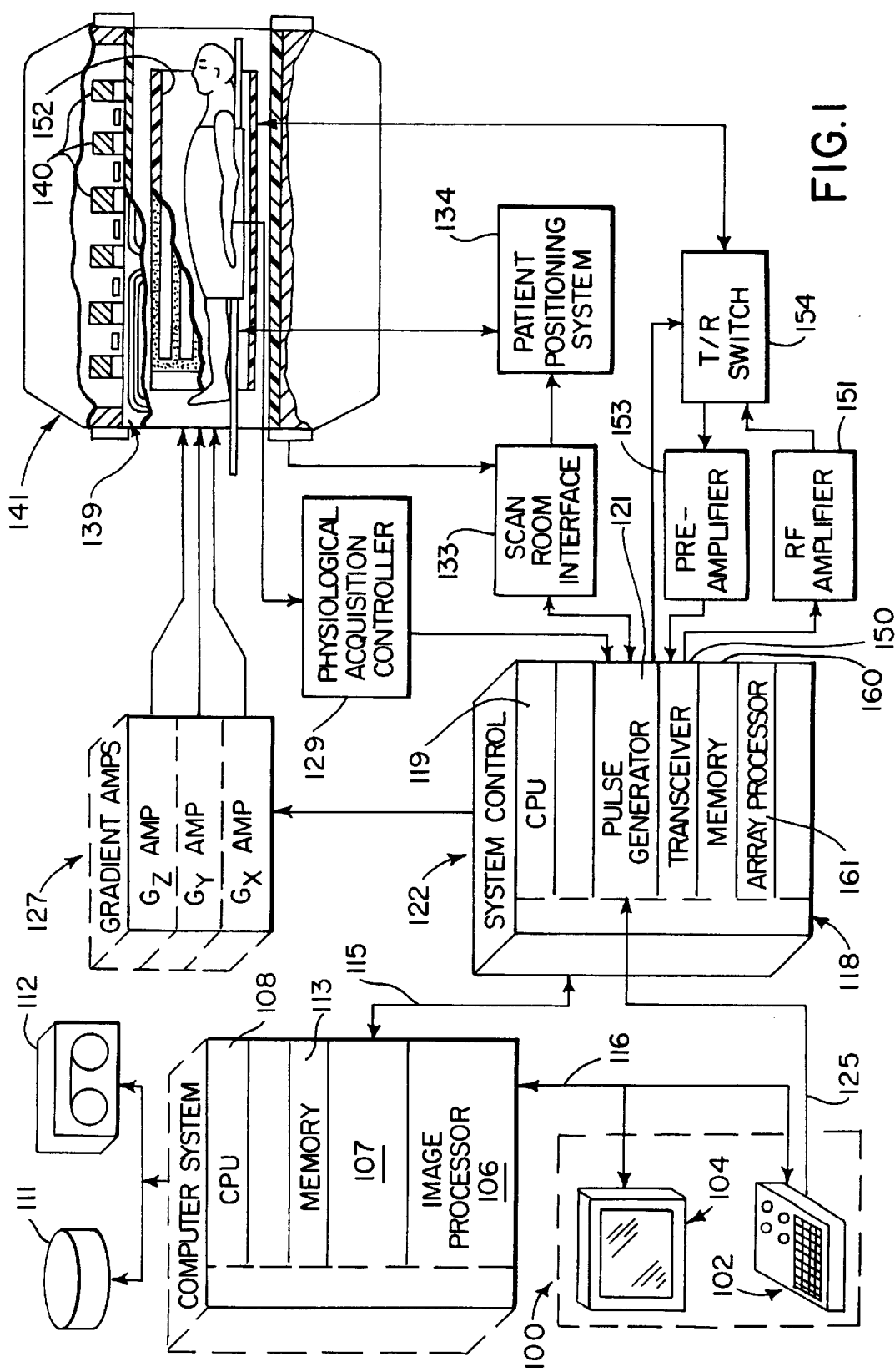
FIG. 1 is a block diagram of an MRI system which employs the present invention.
Figure 2:
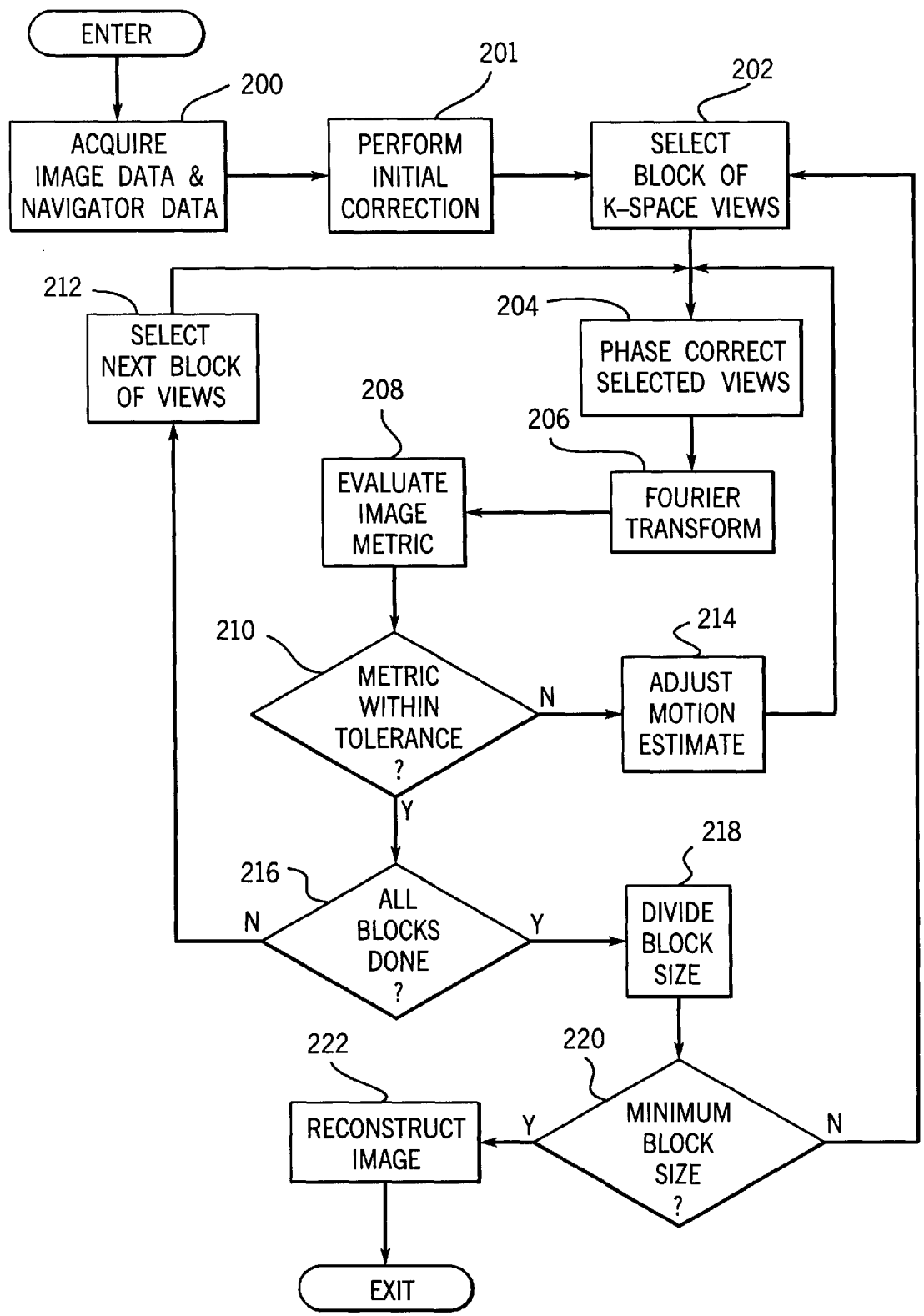
FIG. 2 is a flow chart which illustrates the steps performed by the MRI system of FIG. 1 to practice the preferred embodiment of the invention.

Referring first to FIG. 1, there is shown the major components of a preferred MRI system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. a transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode. 20 The NMR signals picked up by the RF coil 152 are digitized by the transceiver module 150 and transferred through a backplane 118 to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

For a more detailed description of the transceiver 150, reference is made to U.S. Pat. Nos. 4,952,877 and 4,992,736 which are incorporated herein by reference.

The hypothesis of this invention is that navigator echoes and 35 autocorrection can be combined into a single correction approach which combines the advantages and reduces the disadvantages of either technique alone. To understand how a single navigator echo can be used to determine the position of an object during imaging, first consider a basic 2DFT spin-echo imaging sequence. In this situation, the k-space signal is described by:

$$M_{xy}(k_x, k_y) = \iint m_{xy}(x,y) e^{-2\pi i k_x x} e^{-2\pi i k_y y} dx dy \quad (1)$$

where $m_{xy}(x,y)$ is the spatial distribution of magnetization and $k_x$ and $k_y$ are the k-space spatial frequency terms which are proportional to the gradients $G_x$ and $G_y$ respectively. A navigator (NAV) echo is obtained by acquiring an image echo without phase encoding resulting in the signal:

$$NAV(k) = M_{xy}(k_x, 0) = \iint m_{xy}(x,y) dy e^{-\pi i k x} dx \quad (2)$$

Eq. 2 is a version of the central slice theorem and states that the Fourier transform of the projection of the object is equal to the k-space image data where $k_y$ is equal to zero. When the readout gradient direction for the navigator echo is reversed then Eq. 2 becomes:

$$NAV(k) = M_{xy}(0, k_y) = \iint m_{xy}(x,y) dx e^{-2\pi i k y} dy \quad (3)$$

and the navigator echo is now sensitized along the phase encoding direction of the acquired k-space image data of equation (1).

When rigid body motion occurs along the phase encoding direction during image acquisition, an extra phase term is added to each k-space view according to:

$$M_{xy}(k_x, k_y) = M_{xy}(k_x, k_y) e^{i\Delta\phi(k_y)} \quad (4)$$

where $e^{i\Delta\phi(k_y)}$ is the phase term, which is constant for a given view. In an ideal situation, this term can be isolated from the motion corrupted data set by calculating the k-space phase difference between a navigator echo signal as expressed in equation (3) and the corrupted image data for the sample at $k_x=0$. That is:

$$\Delta\phi(k_y) = \arg[M_{xy}(0, k_y)] - \arg[NAV(k)] \quad (5)$$

where arg represents the phase of the complex signal. Once $\Delta\phi(k_y)$ is determined, motion induced artifacts can be reduced by correction of the acquired k-space image data with the view-to-view phase term $-\Delta\phi(k_y)$.

Figure 3:
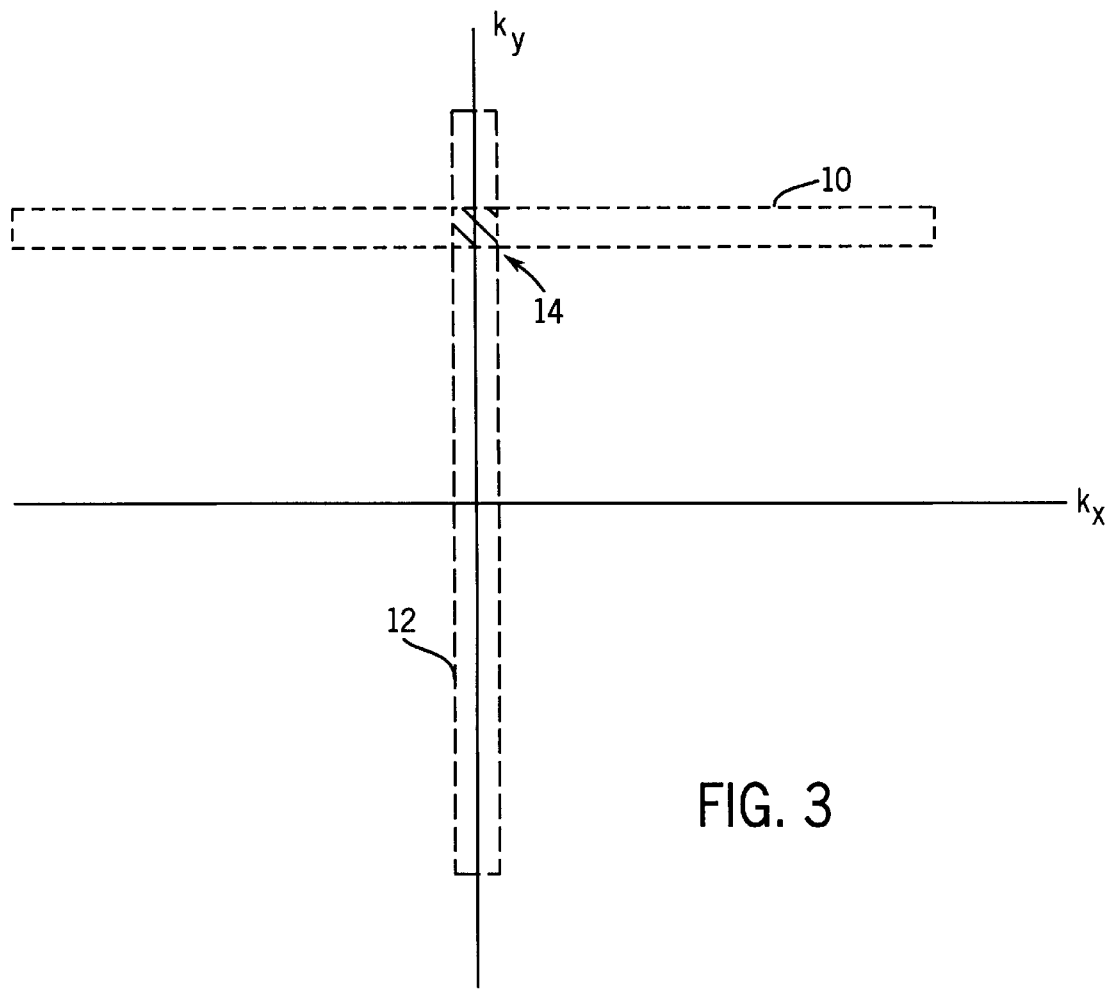
FIG. 3 is a pictorial representation of how acquired image data is corrected using navigator signal information.

This initial correction of one view of acquired k-space image data is illustrated in FIG. 3. The view 10 to be corrected is at a particular $k_y$ phase encoding and is comprised of samples along the $k_x$ imaging readout gradient axis. The navigator signal 12 has no phase encoding (i.e. $k_x=0$) and it is comprised of samples along the ky navigator signal readout gradient axis. Ideally, the phase $\phi$ of the signal samples at the intersection 14 should be the same, and the phase difference $\Delta\phi$ is the correction estimate in equation (5).

The application of Eq. 5 to determine view-to-view phase corrections requires that the image acquisition sequence sample the DC term (in this instance, $k_x=0$) for all image views. However, in routine image acquisition this term is not acquired and values of $K_x = \pm 0.5$ cycles/FOV are acquired instead due to the requirements of an even number of sample points imposed by the fast Fourier transform. To ensure that the actual DC term is centered, an extra prephasor gradient pulse may be used in some applications along the phase encoding and frequency encoding directions. These gradients do not add any extra time to the acquisition. For the frequency encoding direction, the extra gradient is included as part of the prephasor of the readout gradient. For the phase encoding direction the extra gradient is added as a constant for all phase encoding values. Since the resolution of the frequency bin is related to the field of view in any direction by:

$$\Delta k_{x, y} = \frac{1}{FOV_{x, y}} \quad (6)$$

an increment of $\Delta k/2$ along the $k_x$, or $k_y$ axes is easy to compute and implement. The effect of shifting the echo in this manner has no effect on the reconstructed magnitude image.

The autocorrection method is employed to reduce image artifacts in k-space image data sets acquired with the MRI system of FIG. 1. In the preferred embodiment a scan is performed using the chosen NMR pulse sequence to acquire both image data and navigator data as indicated at process block 200. The navigator data is acquired during a prescan in which the readout gradient is switched to the direction of the imaging pulse sequence phase encoding gradient, and as many as ten navigator signals are acquired and averaged together. The imaging data is then acquired in the usual manner and stored as a k-space image data set.

As indicated at process block 201, the acquired image data is then corrected using the phase information in the navigator signal. As indicated above, this is a phase correction as indicated in equation (5) which is made to each view of the k-space image data set. That is, the phase difference ($\Delta\phi$) between the central sample (i.e. $k_x=0$) of each image data view and the phase of the "intersecting" navigator sample is calculated. Then, each sample of the image data view is initially corrected by shifting its phase by this amount. This initial correction of the image data using an estimate based on the navigator signal measurement of patient position "seeds" the autocorrection process.

After this seeding, the iterative autocorrection process begins by selecting, an initial block of image data k-space views as indicated at process block 202. In the preferred embodiment 64 views are selected in this initial block. The views in this block are then phase shifted as indicated at process block 204 based on an initial motion estimate. The altered k-space data set is then Fourier transformed as indicated at process block 206 to produce an image. As indicated at process block 208, the image metric is then calculated using this reconstructed image. In the preferred embodiment the image metric ($F_1$) applies a one-dimensional gradient operator along the image direction of greatest motion and then calculates the entropy of this gradient.

$$F_{12} = -\sum_{ij} h_{i,j} \log_2[h_{i,j}] \quad (7)$$

where:

$$h_{i,j} = \frac{\left\| \begin{bmatrix} 1 \\ -1 \end{bmatrix} * g_{i,j} \right\|}{\sum_{ij} \left\| \begin{bmatrix} 1 \\ -1 \end{bmatrix} * g_{i,j} \right\|} \quad (8)$$

$g_{ij}$ = gradient at image pixel located at row $i$ and column $j$.

If the calculated metric is minimized to within a preset tolerance as determined at decision block 210, the block of 64 views has been corrected and the next block of 64 views is selected as indicated at process block 212 and the process repeats. Otherwise, the motion estimate for this block is adjusted at process block 214 and the process is repeated to evaluate the image metric with the corresponding adjusted phase shift.

All blocks of k-space views are separately adjusted in phase starting at the center of k-space and working outward. When the last block has been corrected as determined at decision block 216, the block size is reduced in size as indicated at process block 218 and the system branches back to process block 202 to repeat the steps on the smaller block size. The process is repeated and the block size is reduced until the minimum block size has been processed as determined at decision block 220. In the preferred embodiment block size is divided by two after each iteration, and the minimum block size is one view. The corrected k-space data set is then Fourier transformed to reconstruct an optimal image as indicated at process block 222.

It should be apparent that the autocorrection method can be employed on one, two or three axes of motion. In many clinical applications of the method, it has been discovered that processing only a single axis of motion is necessary. This reduces the processing time considerably. For example, if the motion is primarily along the phase encoding direction, a one dimensional FFT along the readout gradient direction can be performed once on the acquired k-space image data set before the autocorrection method is applied. The phase corrections in process 204 are made on this hybrid-space data set and the Fourier transform in process 206 can be a one-dimensional FFT along the phase encoding gradient direction.

Also, in many clinical applications only a small portion of the reconstructed image is clinically important. The autocorrection method may be modified in this situation to evaluate the image metric in process block 208 only in the selected region of interest. That is, the operator identifies the pixels in the region of interest and the image metric is calculated only on these pixels. This reduces processing time and in some cases improves the resulting image in the critical region.

For example, the complete image many contain 256 columns of pixels which must be Fourier transformed each time the metric is to be calculated. If the region selected by the operator extends over only 64 columns of pixels, then only those 64 columns need be Fourier transformed during each evaluation iteration. This reduces the processing time by a factor of four.

The synergistic use of the central slice and autocorrection appear to reduce all visible artifacts in both phantom and in-vivo data. Phantom data indicates that a 50% reduction in computation can be achieved as compared to autocorrection alone. The initial in-vivo data indicate the clinical feasibility of this technique. We postulate that the clinical applications of this technique include situations where the acquisition of interleaved navigator echoes perturb the magnetization history of the imaging sequence. If the acquisition of a limited number of navigator echoes is performed as part of a standard prescanning protocol, no extra time will be added to the scanning sequence and spin perturbations from navigator echoes will be eliminated. This technique may also have further applications in key-hole imaging where the phase correction term derived from the central slice theorem can be used to correct for motion occurring during the repetitive acquisition of the low frequency views.

The number of navigator echoes acquired during a scan and the manner in which they are interleaved with the imaging pulse sequences will depend on the particular application. Only a single navigator whose signal may be acquired at the beginning, middle or end of the image acquisition, or as many as ten or more may be acquired during the acquisition. One navigator echo signal may be acquired for per shot for a multi-shot acquisition, or navigator echoes may be acquired on demand if image quality looks bad.

What is claimed is:

1. A method for correcting a medical image for artifacts, the steps comprising:
   a) acquiring a navigator signal;
   b) acquiring a series of views to form an image data set;
   c) comparing the navigator signal with views in the image data set;
   d) correcting the views in the image data set based on the comparison in step c);
   e) reconstructing an image from the acquired image data set;
   f) evaluating the quality of the reconstructed image by calculating a metric based on the image;
   g) iteratively minimizing the metric by making further corrections to views in the image data set and repeating steps e) and f).

2. The method as recited in claim 1 in which the artifacts are caused by patient motion.

3. A method for correcting an MRI image for artifacts caused by patient motion, the steps comprising:
   a) acquiring an NMR navigator signal which has phase information indicative of patient positioning;
   b) acquiring a k-space image data set as a series of views;
   c) comparing phase information in the NMR navigator signal with phase information in acquired views;
   d) correcting views in the k-space image data set based on the comparison in step c);
   e) reconstructing an MR image from the k-space image data set;
   f) evaluating the quality of the MR image by calculating a metric based on the MR image;
   g) iteratively minimizing the metric by making further corrections to views in the k-space image data set and repeating steps e) and f).

4. The method as recited in claim 3 in which each view is acquired with a pulse sequence which includes producing a phase encoding gradient directed along one axis and producing a readout gradient directed along an orthogonal axis, each of said views differs by the amount of the phase encoding gradient, and the NMR navigator signal is acquired with a pulse sequence which includes producing a readout gradient directed along said one axis.

5. The method as recited in claim 4 in which a plurality of NMR navigator signals are acquired and the steps include:
   calculating the average of the acquired NMR navigator signals for use in step c).

6. The method as recited in claim 3 in which the phase of a signal sample in the NMR navigator signal is compared with the phase of a signal sample in each of said views.

7. The method as recited in claim 6 in which the correction of each view in step d) is based on the difference in phase of said signal samples.

8. The method as recited in claim 3 in which all the views in the k-space data set are compared in step c) and corrected in step d).

9. The method as recited in claim 3 in which calculating the metric in step f) includes calculating the MR image gradient.

* * * * *